Aug. 16, 1938.  E. E. WHITNEY ET AL  2,127,149
BALL BEARING ROLL
Filed May 20, 1935
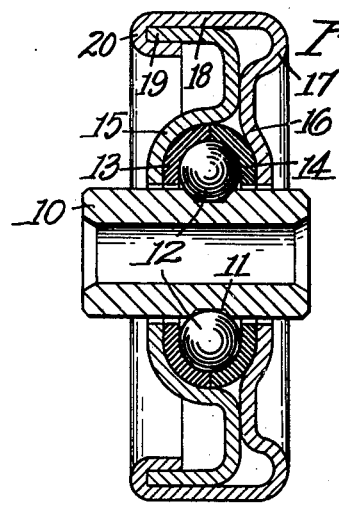
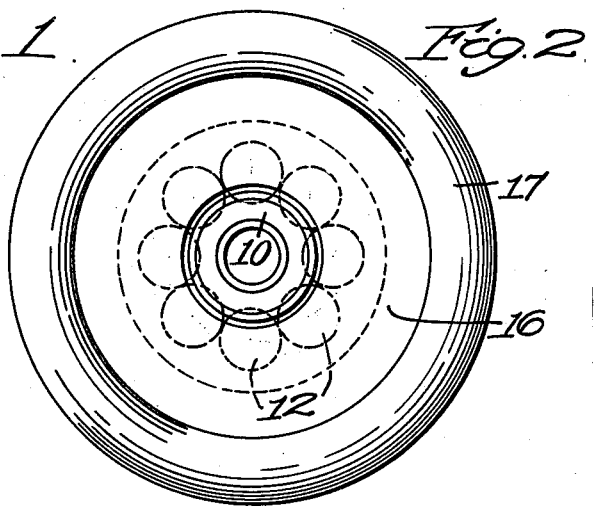
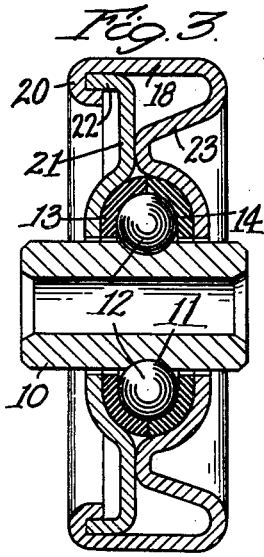
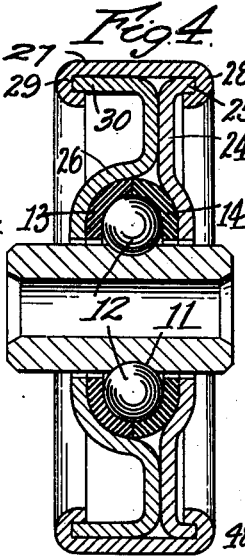
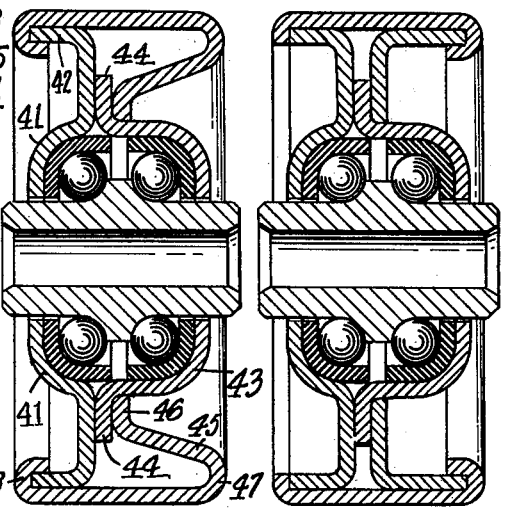
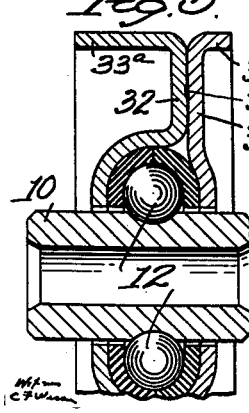
Inventors.
Edward E. Whitney
Lewis W. Horton Patented Aug. 16, 1938

2,127,149

UNITED STATES PATENT OFFICE 2,127,149

BALL-BEARING ROLL

Edward E. Whitney and Lewis W. Hontoon, Worcester, Mass., assignors to Matthews Manufacturing Company, Worcester, Mass., a corporation of Massachusetts Application May 20, 1935, Serial No. 22,326

1 Claim. (Cl. 301—5.7)

This invention relates to a ball-bearing roll for use on roller skates and other places in which the roll itself is composed generally of two or more parts which are so constructed that they hold each other together, and in which the projecting cylindrical flange of the inner part, when that is used, is surrounded by a flange on the outer part turned in over it so that the end of the inner flange does not have to be machined; to provide a construction in which the two parts of the roll engage the opposite sides of a ball casing, preferably made in two parts separated along a plane perpendicular to the axis of the roll. The principal objects of the invention are to provide for more securely holding the two parts of the ball casing by arranging the two parts of the roll in such a position that the division or joint between the two parts of the ball casing will come entirely within one part of the roll thereby preventing the joint between the two parts of the ball casing and the two parts of the roll from coinciding, and also relying on the single part of the roll which over-laps the joint between the two parts of the ball casing to hold the ball casing itself. The invention is applicable to ball bearing rolls having either one series of balls or two, and any roll illustrated or described herein for either can be used, with or without minor modifications, for the other.

Other objects and advantages of the invention will be described hereinafter.

Reference is to be had to the accompanying drawing, in which

Fig. 1 is a diametrical sectional view of a ball-bearing roll constructed in accordance with a preferred form of this invention;

Fig. 2 is a side view of the same;

Figs. 3, 4, 5 and 6 are views like Fig. 1, showing other ways in which the invention can be applied to a roll having a single series of balls, and Figs. 7 and 8 are similar views showing how the invention can be applied to a roll having two sets of bearing balls.

Referring first to Figs. 1 and 2, it will be seen that the central shaft 10 is provided with a groove 11 in which a single set of balls 12 roll. These balls are held by a ball casing which consists of two parts 13 and 14. In this case the two parts divide along a plane which passes through the axes of the balls and is transverse to the axis of the shaft or stud 10.

The roll itself is made of two parts 15 and 16. These two parts are curved to conform to the shape of the ball-casing, but the part 15 projects beyond the center, and therefore beyond the line of division between the two halves of the ball casing, thus holding the ball casing itself, except that the part 16 of the roll also engages the ball casing on the other side, and as will be seen, firmly holds it in position. The parts 15 and 16 come into contact with each other along a plane surface at one side or the other of the plane which is the division between the two halves of the ball casing.

The part 16 of the roll, beyond the point at which the two parts of the roll come into contact, is widened out at 17 so as to provide a cylindrical outer surface or tire for the roll, and this widened out part extends through the cylindrical surface 18 which constitutes the bearing surface of the roll. The part 15 beyond the point of contact previously mentioned has a cylindrical flange 19 which extends inside the roll surface 18 and along it to the side opposite the projection 17. It is surrounded and held in position by a flange 20 on the roll surface 18 which extends around the edge of the flange 19 and inside of it. The flange 20 is spun inwardly into contact with the inside of the flange 19. On account of this construction the edge of the flange 19 does not have to be machined, thus eliminating one operation and reducing the cost of construction.

Fig. 3 shows a construction following very closely that shown in Fig. 1, and the numerals 10, 11, 12, 13 and 14 are used as applying to the same elements as in Fig. 1, but in this case one of the halves or sides 21 of the roll has a small surface engaging the side of the ball casing 13 and then extends outwardly in a plane. Then it is bent outwardly to form a flange 22. On the other side the part 23 of the roll also engages the ball casing and extends over the plane of division between the two parts thereof and into contact with the part 21. Then it extends outwardly to the edge of the roll and backwardly to form the roll surface 18 as before. It is provided with a spun flange 20 having the same functions as in the other case.

In the form shown in Fig. 4 the same elements 10, 11, 12, 13 and 14 are employed, but in this case a part of the roll very similar to the part 23 shown in Fig. 3 is designated 24 and has a flange 25. The other half 26 of the roll extends over the line of division between the halves of the ball casing and contacts with the part 24 from that point practically to the tire. In this case the roll is provided with a tire 27 which has two flanges 28 and 29 which extend over the corresponding flanges of the parts 24 and 26 and holds the structure together as well as eliminating the necessity of squaring up the flanges 25 and 30.

In the same way Fig. 5 shows a construction in which the two parts of the roll each have two flat portions 31 and 32 having corresponding functions regarding the ball casing, but they extend nearer to the circumference and each has a flange, 33 and 33ª respectively, which are of the same diameter and constitute the tire or rolling surface of the roll. They are directly held together by a securing means in the form of a welded spot 32ª.

In the form shown in Fig. 6 one side 34 of the roll simply extends outwardly and is bent over to provide a flange 35 while the other half 36 passes over the center of the ball race and outwardly in contact with the member 34. The member 36 has a flange 37 of the same diameter as the flange 35, and in this case a tire 38 extends around both of them and holds them together. Although one flange is not bent down under the flange 35, still it holds the roll together.

As stated above these several devices can be used with two sets of balls instead of one, and we have shown in Figs. 7 and 8 two applications of this idea, although they are not exactly like any of those previously illustrated. In Fig. 7 there is a part 41 of the roll which holds one ball casing and then extends outwardly and is provided with a cylindrical flange 42 at its edge. On the other side there is a member 43 which holds the other ball case and extends over the space between the two and has a flat flange 44 contacting with the member 41. The third member 45 has an inwardly extending flange 46 which contacts with the flange 44. The part 45 is extended outwardly at 47 to make the roll of the proper width. This part has a spun over edge 48 which holds the end of the flange 42 and thus unites the whole structure together.

In Fig. 8 the construction is substantially the same as that shown in Fig. 6 except that there is a pair of sets of balls. In each case there is at least one set of bearing balls and a double casing therefor having a division arranged circumferentially while the roll itself is formed of at least two pieces, and there are at least two pieces each one engaging the opposite ball casing. The two or more pieces of the roll itself are secured together in a simple and inexpensive manner so that in some cases the finishing of the edge of the inner part is rendered unnecessary, thus reducing the cost and providing means for holding one of the ball cases in exact position.

Having thus described our invention and the advantages thereof we do not wish to be limited to the details herein disclosed, otherwise than as set forth in the claim, but what we do claim is:—

As an article of manufacture, a ball bearing roll comprising a set of bearing balls, a shaft on which the balls directly bear, a double casing for retaining the balls split in the center, and a roll formed of sheet metal and formed of two pieces, having plane radial surfaces, just outside said ball retaining casing, in contact with each other for a material distance entirely beyond and around the outer surface of said ball casing, engaging the opposite parts of the casing, one of the pieces of the roll extending beyond the plane of separation of the two parts of the ball casing and having a cavity enclosing one part of the split casing and said piece being in contact with the adjacent edge of the other to cover the joint therebetween.

EDWARD E. WHITNEY.
LEWIS W. HONTOON.